United States Patent [19]

Kopich

[11] 4,272,993
[45] Jun. 16, 1981

[54] HYDRAULICALLY CONTROLLED DIFFERENTIAL

[75] Inventor: Leonard F. Kopich, Madison Heights, Mich.

[73] Assignee: General Motors Corporation, Detroit, Mich.

[21] Appl. No.: 950,418

[22] Filed: Oct. 11, 1978

[51] Int. Cl.³ ........................... F16H 1/42; F16H 1/44
[52] U.S. Cl. .......................................... 74/711; 74/714
[58] Field of Search ..................... 74/710.5, 711, 714; 418/199

[56] References Cited

U.S. PATENT DOCUMENTS

| | | | |
|---|---|---|---|
| 1,229,548 | 6/1917 | Van Sant | 74/711 |
| 2,400,728 | 5/1946 | Akers | 74/714 X |
| 2,949,792 | 8/1960 | Smith | 74/711 |
| 3,015,970 | 1/1962 | Mueller | 74/711 |
| 3,034,322 | 5/1962 | Miller | 64/26 |
| 3,229,550 | 1/1966 | Nickell | 74/711 |
| 3,232,139 | 2/1966 | Nickell | 74/711 |
| 3,251,244 | 5/1966 | Nickell | 74/711 |
| 3,375,735 | 4/1968 | Saari | 74/711 |
| 3,393,583 | 7/1968 | Mueller | 74/711 |
| 3,590,954 | 7/1971 | Plantan | 184/6 U |
| 3,724,289 | 4/1973 | Kennicutt | 74/711 |
| 3,831,461 | 8/1974 | Mueller | 74/711 |
| 4,041,804 | 8/1977 | Clark | 74/711 |
| 4,084,654 | 4/1978 | Dudek | 180/44 |

Primary Examiner—C. J. Husar
Assistant Examiner—Frank McKenzie
Attorney, Agent, or Firm—F. J. Fodale

[57] ABSTRACT

A planetary gear differential has a pair of side gears and two pairs of composite planet gears rotatably carried by a rotatable carrier. Each pair of composite planet gears includes meshing impeller gears and drive gears meshing respective side gears. Hydraulic control means for limiting the differential speed of the side gears comprises two closed hydraulic circuits located in the carrier. Each circuit includes a gear pump chamber having the meshing impeller gears of one pair of composite planet gears disposed therein, and a pair of opposed unidirectional restrictions located in conduits leading from opposite radial sides of the gear pump chamber to an inner annular sump common to both circuits.

4 Claims, 4 Drawing Figures

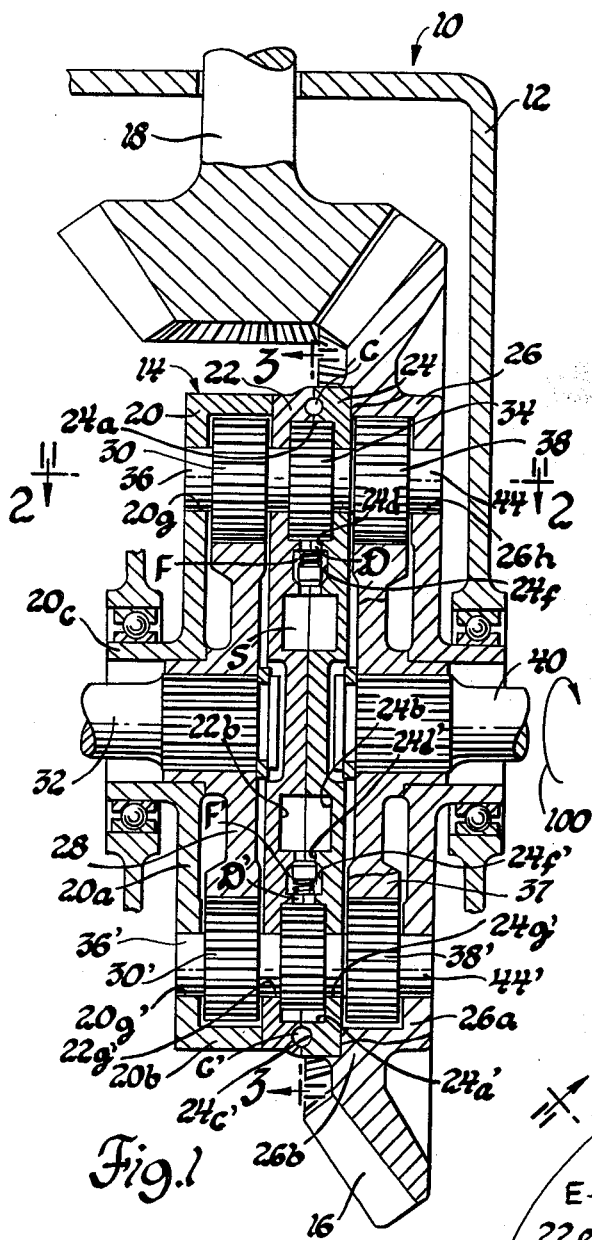
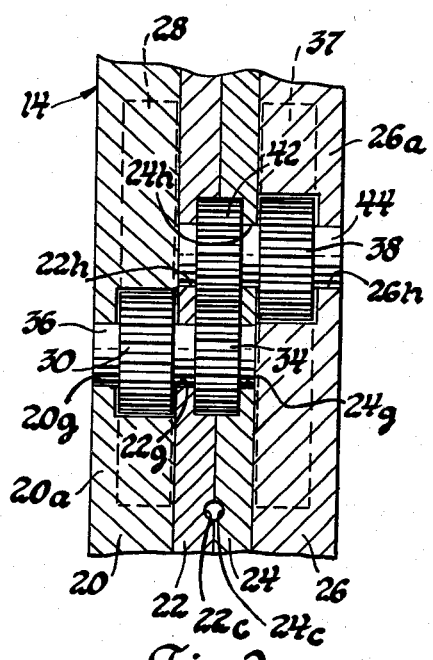
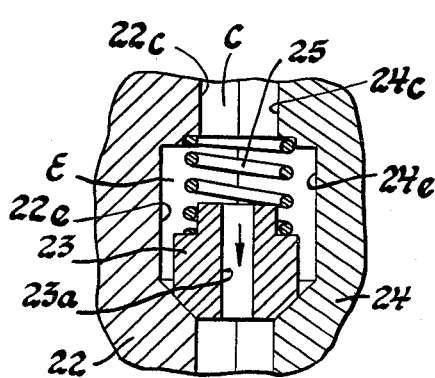
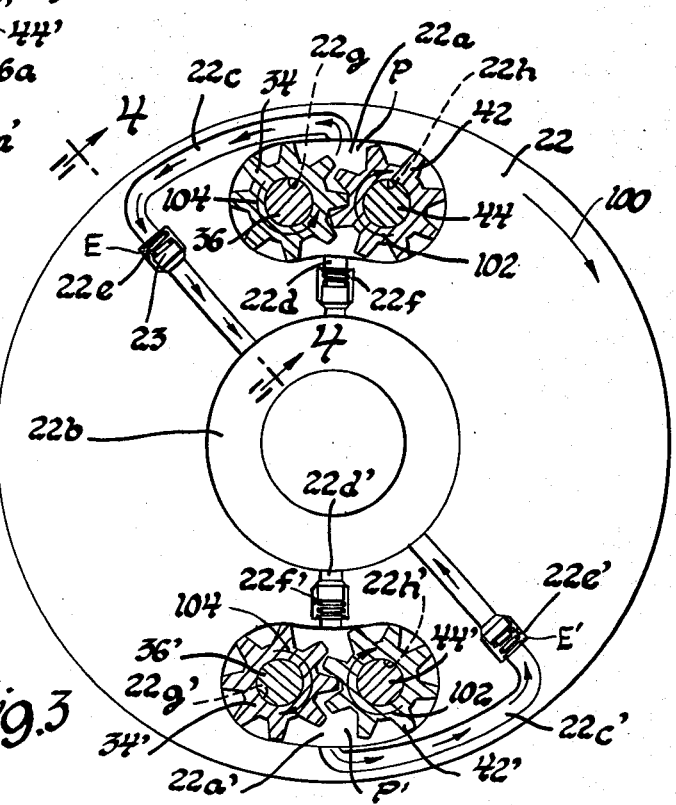

HYDRAULICALLY CONTROLLED DIFFERENTIAL

This invention relates generally to a differential and more specifically to a limited slip differential.

A differential is a well-known device having a single input member which drives two output members in a manner which permits the two output members to be driven at different speeds responsive to external conditions. Differentials are used for instance, in an automotive drive line between a propeller shaft and drive axles for each of the two rear drive wheels to drive the outside wheel faster than the inside wheel in a turning movement.

It is also well-known to provide a limited slip differential which limits differential speed between the two output members to insure that both output members are driven even when there is little or no reaction force on one of the outer output members such as when one driven wheel of an automobile is on ice.

It is also known from U.S. Pat. No. 1,229,548 granted to Thomas G. and Victor H. Van Sant June 12, 1917 to provide a planetary gear differential which incorporates pairs of composite planet gears having meshing portions which cooperate with oil or grease in the differential housing in the manner of a gear pump to limit differential speed and prevent the spinning of either output member while the other remains stationary. More specifically, the Van Sant differential alternates pairs of composite planet gears each comprising two larger meshing gears 23 disposed in recesses 22 and two smaller gears 24 meshing with side gears 5 and 6 respectively. According to the Van Sant specification, oil or grease in the differential housing enters the recesses 22 via passages 26 through the carrier 11, 12 and passages 27 through the side gears 5, 6 during operation. When the differential is in a differential mode of operation, the larger meshing gears 23 rotate and according to the Van Sant specification compress a quantity of oil or grease in the chamber 22 which prevents further rotation of the meshing gears 23 resulting in a locked mode of operation where the side gears 5 and 6 are driven at the same speed.

It is not known whether the Van Sant differential was ever produced and used commercially. However it appears that the limited slip operation of the Van Sant differential is questionable at best and at least does not provide for a smooth transition between differential and locked modes of operation. This is because grease or oil enters the recesses 22 via passages 27 through the side gears 5, 6 which during the differential mode of operation rotate relative to the carrier 11, 12 constantly blocking and unblocking the recesses 22 from the passages 26. Consequently the transition to a locked mode of operation would be rather abrupt and possibly oscillatory, that is, changing back and forth between the operational modes as the recesses 22 are constantly opened and closed by the side gears.

Another drawback of the Van Sant differential is the arrangement of the planet gears in alternate pairs (F and R in FIG. 2) for forward and reverse conditions. This arrangement doubles the planet gear requirements and as a practical matter limits balanced locking to two diametrically opposed alternate pairs.

Still another drawback of the Van Sant differential is the requirement for smaller planet drive gear 24 to permit access of the grease or oil to larger planet impeller gears 23 via passages 27 in the side gears 5, 6.

It is generally the object of this invention to provide a limited slip planetary gear differential which is smooth in operation in comparison to that disclosed in the aforementioned Van Sant patent.

Another object of this invention is to provide a limited slip planetary gear differential which is hydraulically controlled for a smooth transition between differential and limited slip modes of operation.

Another object of this invention is to provide a limited slip planetary gear differential having an associated pair of composite planet gears including meshing impeller gears disposed in a gear pump included in a closed hydraulic circuit for controlling the differential speed of the side gears.

Another object of this invention is to provide a limited slip planetary gear differential which is hydraulically controlled by a closed bi-directional hydraulic circuit to prevent spinning of either output shaft in either direction.

Yet another object of this invention is to provide a limited slip planetary gear differential in which any number of associated planetary gear pairs may be utilized in a corresponding number of closed hydraulic circuits.

Yet another object of this invention is to provide a limited slip planetary gear differential controlled by a closed hydraulic circuit located in the carrier for compact design.

Still another object of this invention is to provide a hydraulically controlled limited slip differential in which the associated drive and impeller planet gears may be of the same size to simplify manufacture.

Other object and features of the invention will become apparent to those skilled in the art as the disclosure is made in the following detailed description of a preferred embodiment of the invention as illustrated in the accompanying sheet of drawing in which:

FIG. 1 is a vertically sectioned schematic of a hydraulically controlled limited slip planetary differential in accordance with this invention, FIG. 2 is a section taken substantially along the line 2—2 of FIG. 1 looking in the direction of the arrows, FIG. 3 is a section taken substantially along the line 3—3 of FIG. 1 looking in the direction of the arrows, and FIG. 4 is a section taken substantially along the line 4—4 of FIG. 3 looking in the direction of the arrows.

Referring now to the drawing and particularly FIG. 1, there is schematically illustrated a planetary gear differential 10 comprising a housing 12 in which is rotatably mounted a carrier 14 having an integral bevel ring gear 16 meshing with a bevel drive pinion 18 also rotatably mounted in the housing 12.

The carrier 14 comprises four members 20, 22, 24 and 26 which are secured together by any suitable means. The internal member 22 as best shown in FIG. 3 is a plate which has an outer kidney-shaped recess 22a, an inner annular groove 22b and two channels 22c and 22d in the side face which abuts the internal member 24. The channel 22c extends from a central outer end portion of the recess 22a around the recess 22a to the inner groove 22b and includes an intermediate enlargement 22e. The channel 22d leads from a central inner end portion of the recess 22a to the inner groove 22b and includes an intermediate enlargement 22f.

The internal member 22 has a second recess 22a' and channels 22c' and 22d' (with enlargements 22e' and 22f') diametrically opposite the first recess and channels. The channels 22c' and 22d' lead to the inner annular groove 22b. The internal member 22 also has circumferentially spaced journal bores 22g, 22h and 22g' and 22h' which extend through the respective portions partially defining the recesses 22a and 22a'.

The other internal member 24 has recesses 24a, 24a'; channels 24c, 24d, 24c', 24d'; enlargements 24e, 24f, 24e', 24f'; and an annular groove 24b arranged in a mirror image in its abutting surface. When fastened together the internal members 22, 24 form two closed hydraulic circuits having a common sump which are then filled with a hydraulic fluid such as oil. One circuit comprises a pump chamber P (formed by the recesses 22a and 24a) connected at opposite radial ends to the sump S (formed by grooves 22b and 24b) by conduits C and D (formed by channels 22c, 24c and 22d, 24d). Conduit C has a restrictor chamber E (formed by enlargements 22e and 24e) which as shown in FIG. 4, contains a movable flow restrictor 23 having a restricted through passage 23a biased against a conical seat in a flow restrictive position by a spring 25. Conduit D also has a restrictor chamber F containing a movable flow restrictor and spring which is of like construction but in an opposite flow restrictive orientation. That is, one flow restrictor restricts flow from the pump chamber P while the other permits a substantially unrestricted flow to the pump chamber and vice versa.

The other circuit similarly comprises pump chamber P' (formed by recesses 22a' and 24a') connected to the common sump S by conduits C' and D' (formed by channels 22', 24c' and 22d', 24d') which include restrictor chambers E' and F' having movable restrictors and springs in opposite flow restrictive orientations.

The outer member 20 of the carrier 14 comprises an end wall 20a and a flange 20b which creates a spacing for a spur-type side gear 28 and a pair of planet drive gears 30 and 30' which mesh with it. The side gear 28 has a hub which is rotatable in a central journal 20c in the end wall 20a and has internal splines connecting the side gear 28 to an output shaft 32.

The planet drive gear 30 is associated with a planet impeller gear 34 disposed in the pump chamber P. Both are pressed on or otherwise non-rotatably secured to a stub shaft 36 which is journalled in the bores 22g and 24g and an end journal 20g in the end wall 20a. Similarly, the planet drive gear 30' and a planet impeller gear 34' disposed in the pump chamber P' are secured to a stub shaft 36' journalled in the bores 22g' and 24g' and an end journal 20g' in the end wall 20a.

The outer member 26 has an end wall 26a and a flange 26b which creates a spacing for a second spur-type side gear 37 which meshes with a second pair of planet drive gears 38 and 38'. The side gear 37 is supported in a central journal of the end wall 26a for rotation with respect to the carrier 14 and splined to a second output shaft 40. The planet drive gear 38 and a planet impeller gear 42 (disposed in pump chamber P for cooperation with the impeller gear 34) are nonrotatably secured to a stub shaft 44 which is journalled in the bores 22h and 24h and an end journal 26h in the end wall 26a. Similarly planet drive gear 38' is coupled to a planet impeller gear 42' in pump chamber P' by a stub shaft 44'.

The operation of the hydraulically controlled differential 10 is as follows.

When rotation of each of the output shafts 32 and 40 is resisted by an equal reaction force, such as in driving an automobile in a straight path down a smooth road, the planet impeller gears 34, 42, 34', 42' remain stationary on the carrier 14 and the bevel drive pinion 18 drives the carrier 14 and the side gears 28 and 37 as a solid unit at the same speed.

When rotation of one output shaft is resisted by a greater reaction force than the other, such as in a turning maneuver, the differential 10 drives the output shafts in inverse proportion to the reaction forces and the outside wheel is driven faster than the inside wheel. For instance, assume the output shaft 40 has a higher reaction force than the output shaft 32 when the carrier 14 is driven in the clockwise direction as shown by the arrow 100 in FIG. 3. In the differential mode of operation, the speed of the output shaft 40 and side gear 37 is slower than that of the carrier 14 causing the planet drive gears 38 and 38' and planet impeller gears 42 and 42' to rotate clockwise as shown by the arrow 102. The planet impeller gears 42 and 42' rotate the planet impeller gears 34 and 34' and planet drive gears 30 and 30' counterclockwise as indicated by the arrow 104. The planet drive gears 30 and 30' in turn drive the side gears 28 and output shaft 32 clockwise at a greater speed than that of the carrier 14.

The counterrotating planet impeller gears 34 and 42 also pump fluid in pump chamber P out through the conduit C into the sump S via the restricted passage 23a as indicated by the arrows. The opposite side (inlet in this instance) of the pump chamber P is fed from the sump S via the conduit D. The movable restrictor 23 in the conduit D does not restrict the flow to the pump chamber P to any appreciable extent as back pressure lifts the movable restrictor 23 off the valve seat in the restrictor chamber F.

Similarly, the counterrotating planet impeller gears 34' and 42' pump fluid out of the pump chamber P' through through the conduit C' to the sump S from whence it returns to the pump chamber P' via the conduit D'.

As the differential speed increases the speed of the counterrotating planet impeller gears 34, 42; and 34', 42' increases, pumping the fluid through the closed hydraulic circuits at a faster and faster rate. The flow, however, is restricted by the restrictors 23 in the chambers E and E' which are sized to limit the flow rate to a predetermined value and which gradually limit the speed of the planet impeller gears and consequently the differential speed of the output members to a corresponding predetermined value. Because of the flow restrictors 23, the maximum allowable slip is approached smoothly and an abrupt locked condition is avoided.

In instances where the output shaft 32 and side gear 28 has a higher reaction force, clockwise rotation of the carrier 14 rotates the planet impeller gears 34, 42; and 34', 42' in directions opposite that indicated by the arrows in FIG. 3. In this circumstance the flow in the closed hydraulic circuits is reversed and the movable restrictors in the chambers F and F' limit the differential speed between the side gears 28 and 37. In the reverse direction, that is when the carrier 14 is driven counterclockwise, the differential will operate in one or the other of the above described modes depending on which side gear is slipping. The closed hydraulic control circuits are bi-directional and limit slip of either side gear in either direction.

While two closed hydraulic control circuits have been disclosed, any number may be utilized because of their bi-directional nature. Thus a single circuit may be utilized in a light application where a single pair of planetary gears can handle the loads. On the other hand three, four or more, space permitting, may be utilized for higher torque applications.

I wish it to be understood that I do not desire to be limited to the exact details of construction shown and described, for obvious modifications will occur to a person skilled in the art.

What is claimed is:

1. In a planetary gear differential having a pair of side gears, a pair of composite planet gears rotatably carried by a rotatable carrier, said pair of composite planet gears including meshing impeller gears and drive gears meshing respective side gears, improved hydraulic control means for limiting the differential speed of the side gears comprising:
   a closed hydraulic circuit including a gear pump chamber having the meshing impeller gears disposed therein, and
   a pair of opposed unidirectional restrictions located on opposite sides of the gear pump chamber.

2. In a planetary gear differential having a pair of side gears, a pair of composite planet gears rotatably carried by a rotatable carrier, said pair of composite planet gears including meshing impeller gears and drive gears meshing respective side gears, improved hydraulic control means for limiting the differential speed of the side gears comprising:
   a closed hydraulic circuit in the carrier including a gear pump chamber having the meshing impeller gears disposed therein, and
   a pair of opposed unidirectional restrictions located in conduits leading from opposite sides of the gear pump chamber to a sump.

3. In a planetary gear differential having a pair of side gears, associated pairs of composite planet gears rotatably carried by a rotatable carrier, each of said pairs of composite planet gears including meshing impeller gears and drive gears meshing respective side gears, improved hydraulic control means for limiting the differential speed of the side gears comprising:
   a plurality of closed hydraulic circuits each including a gear pump chamber having the meshing impeller gears of one of the associated pairs of composite planet gears disposed therein, and
   a pair of opposed unidirectional restrictions located on opposite sides of the gear pump chamber.

4. In a planetary gear differential having a pair of side gears, associated pairs of composite planet gears rotatably carried by a rotatable carrier, each of said pairs of composite planet gears including meshing impeller gears and drive gears meshing respective side gears, improved hydraulic control means for limiting the differential speed of the side gears comprising:
   a plurality of closed hydraulic circuits in the carrier, each including a gear pump chamber having the meshing impeller gears of one of the associated pairs of composite planet gears disposed therein, and
   a pair of opposed unidirectional restrictions located in conduits leading from opposite radial sides of the gear pump chamber to an inner annular sump which is common to all hydraulic circuits.

* * * * *